US008060225B2

(12) United States Patent
Hans et al.

(10) Patent No.: US 8,060,225 B2
(45) Date of Patent: Nov. 15, 2011

(54) DIGITAL AUDIO DEVICE (75) Inventors: Mathieu Claude Hans, Athens, GA (US); Mark Taylor Smith, San Mateo, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 2352 days.

(21) Appl. No.: 10/210,263

(22) Filed: Jul. 31, 2002

(65) Prior Publication Data
US 2004/0024478 A1 Feb. 5, 2004

(51) Int. Cl.
G06F 17/00 (2006.01)
(52) U.S. Cl. .................................. 700/94; 379/206.01
(58) Field of Classification Search ............. 379/202.01, 379/206.01
See application file for complete search history.

(56) References Cited

U.S. PATENT DOCUMENTS

| 4,998,281 | A * | 3/1991 | Sakata | 381/63 |
| 6,541,690 | B1 * | 4/2003 | Segers, Jr. | 84/605 |
| 6,653,545 | B2 * | 11/2003 | Redmann et al. | 84/622 |
| 6,807,563 | B1 * | 10/2004 | Christofferson et al. | 709/204 |
| 6,839,416 | B1 * | 1/2005 | Shaffer | 379/202.01 |
| 6,898,637 | B2 * | 5/2005 | Curtin | 709/231 |
| 7,006,617 | B1 * | 2/2006 | Dal Farra et al. | 379/202.01 |
| 2002/0099458 | A1 * | 7/2002 | Rudolph | 700/94 |

OTHER PUBLICATIONS

Rosenberg, Schulzrinne., "Models for Multi Party Conferencing in SIP," Internet Engineering Task Force, Nov. 5, 2001 (http://www.ietf.org/proceedings/01dec/I-D/draft-ietf-sipping-conferencing-models-00.txt).

Lazzaro, J. et al., "A Case for Network Musical Performance," Oct. 16, 2001 (http://www.cs.berkeley.edu/johnw/talks/cnmat-NMP-01.ppt).

"Boy Toy," Wired Magazine, Aug. 2002 (http://www.wired.com/archive/10.08/play.html?pg=4).

* cited by examiner

Primary Examiner — Walter F Briney, III (57) ABSTRACT

A digital audio system configured to facilitate a collaborative audio session comprises a first digital audio device operable by a first user, a second digital audio device operable by a second user independently of the first digital audio device, and a server configured to communicate with the first digital audio device and the second digital audio device over a network, receive a request from at least one of the digital audio devices for participation in a collaborative audio session, and facilitate communication between the first digital audio device and the second digital audio device.

46 Claims, 5 Drawing Sheets

DIGITAL AUDIO DEVICE

FIELD

This patent application pertains generally to the field of digital audio systems, and more specifically, to a digital audio system that enables a collaborative audio session among multiple users.

BACKGROUND

Digital audio players, whether implemented in hardware or software, are widely available and popular for storing and/or playing digital audio content (e.g., digital audio streams, encoded sound recordings, etc.). Digital audio content may be digitized into different formats based on variables, such as bit rate, communication protocol(s), physical medium, compression algorithm, and/or other variables. Common digital audio formats include, without limitation, MPEG (e.g., MP3, etc.), WAV, MIDI, and/or other formats known to those skilled in the art. Digital audio content in various digital formats can be transmitted, as a file or as a data stream, over wireless and/or wired communication networks via appropriate protocols (e.g., HyperText Transport Protocol (HTTP), Real-Time Streaming Protocol (RTSP), and/or other protocols).

Exemplary digital audio players implemented in hardware include, without limitation, Apple iPod, SONICblue Rio, Casio's MP3 audio wrist watch, Compaq iPaq, and other players known to those skilled in the art. Exemplary digital audio players implemented in software include, without limitation, MusicMatch's Jukebox, Realplayer, Microsoft Media Player, and other software players known to those skilled in the art.

Typically, a digital audio player has functions that allow a user to enjoy digital audio content in different ways. These functions may include playback, record, forward, reverse, skip, random play, repeat, and/or other functions. However, digital audio players generally do not provide any audio content manipulation functions, such as DJ functions. Exemplary DJ functions include mixing, scratching, fading, reverse play, looping, and/or other functions. These functions are referred to as DJ functions because they are typically provided by specialized DJ digital turntables, whether implemented in hardware or software, to be used by professional DJs. These functions are known in the art and need not be described in more detail herein.

Professional DJs using a specialized DJ digital turntable are able to perform DJ functions on digital audio content, for example, to create audio content for subsequent distribution via some type of media or for live events. Exemplary DJ digital turntables implemented in software include, without limitation, Acid Pro from Sonic Foundry and American Audio Pro Mix MP3 Player.

The DJ digital turntables are generally designed to be used and controlled by individual DJs and are not readily usable by groups of collaborators (e.g., to create a collaborative audio session and/or live jamming session), particularly if the would-be collaborators are not in the same location. Conversely, digital audio players are generally designed to be used and controlled by individual users. In other words, the networked interactivity that is available for other communications formats (e.g., discussion forums and instant messaging for text, videoconferencing for meetings, etc.) is not available for music and many other types of audio content.

Thus, a market exists for a digital audio system that enables multiple users of digital audio players to be able to join in a collaborative audio session via a networked environment.

SUMMARY

An exemplary embodiment of a digital audio system configured to facilitate a collaborative audio session comprises a first digital audio device operable by a first user, a second digital audio device operable by a second user independently of the first digital audio device, and a server configured to communicate with the first digital audio device and the second digital audio device over a network, receive a request from at least one of the digital audio devices for participation in a collaborative audio session, and facilitate communication between the first digital audio device and the second digital audio device.

An exemplary embodiment of a method for operating a digital audio device in a DJ mode, thereby facilitating a collaborative audio session with another digital audio device, comprises obtaining a first digital audio stream at a first digital audio device operated by a first user, joining a second user having a second digital audio device, which is under independent operational control of the first digital audio device, as a participant in a collaborative audio session with the first digital audio device, obtaining a second digital audio stream from the second digital audio device, digitally integrating at least a portion of the first digital audio stream and the second digital audio stream, and providing the integrated digital audio stream to at least the second digital audio device.

Computer-readable media and devices performing the method, as well as other aspects, are also disclosed.

DETAILED DESCRIPTION

I. Overview

A digital audio system for providing a collaborative audio session among multiple users is provided. Section II describes an exemplary communication network environment, Section III describes an exemplary digital audio device, Section IV describes an exemplary digital audio integration/manipulation module of an exemplary digital audio device, Section V describes an exemplary process for establishing and facilitating a collaborative audio session between or among multiple digital audio devices, Section VI describes an exemplary collaborative audio session, and Section VII describes an exemplary operating environment.

II. An Exemplary Communication Network Environment

Figure 1:
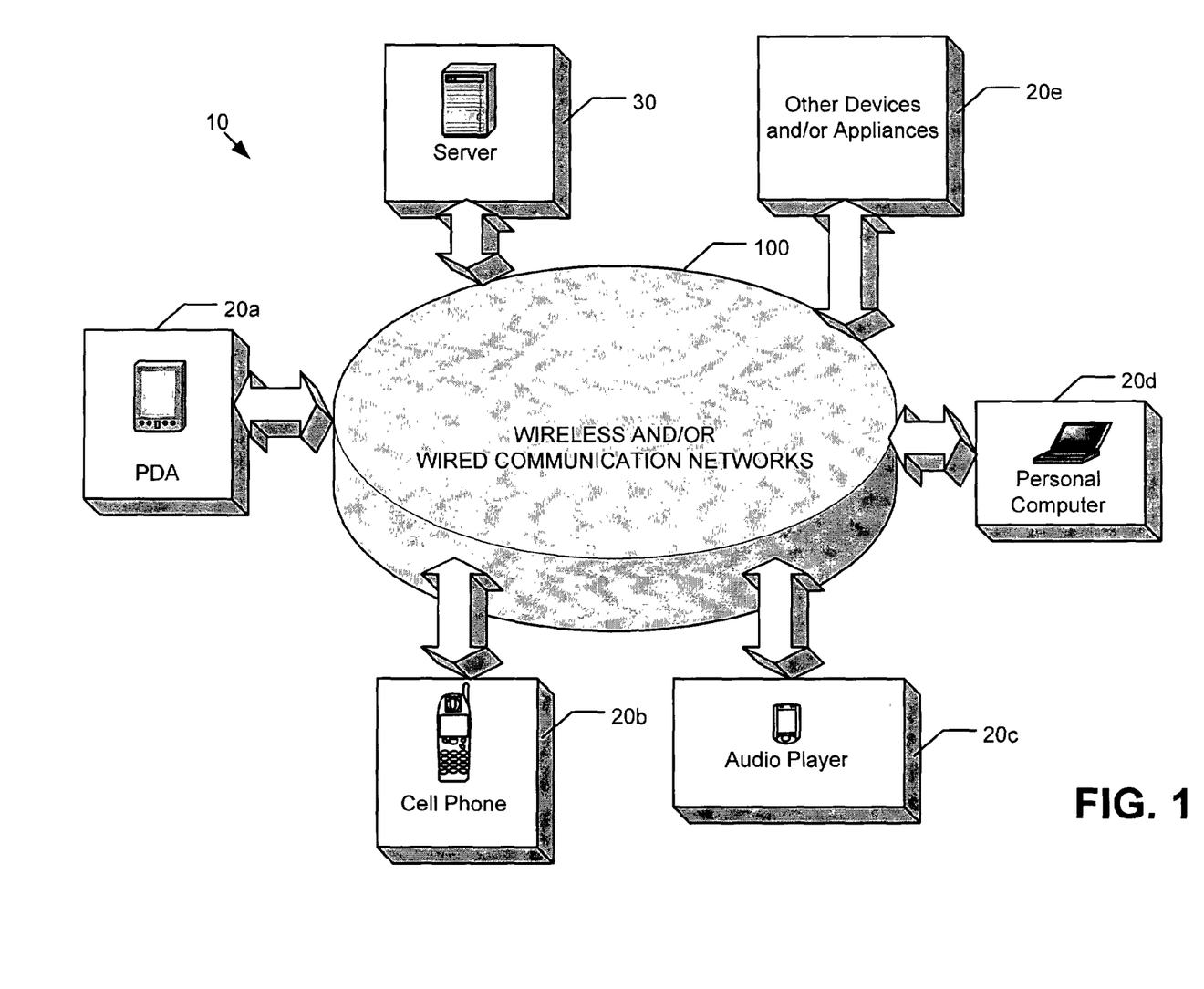
FIG. 1 illustrates a block diagram of an exemplary communication network environment.

FIG. 1 illustrates an exemplary communication network environment 10. The communication network environment 10 includes multiple devices that may be used as one or more digital audio devices that may or may not be portable (e.g., a personal digital assistant (PDA) 20a, a cellular phone 20b, an audio player 20c, a personal computer 20d, and/or other devices and appliances (e.g., a stereo, a wrist watch, etc.) 20e)

and a server 30 connected via wireless and/or wired communication networks 100. The wireless and/or wired communication networks 100 are also connected to other servers and computing devices (not shown).

The server 30 is configured to assist in establishing and/or facilitating a collaborative audio session between and among one or more digital audio devices 20 via the wireless and/or wired communication networks 100. In one implementation, the server 30 is a SIP (Session Initiation Protocol) server and is configured in accordance with SIP standard. The Session Initiation Protocol, is a signaling protocol for network conferencing, telephony, presence, events notification and instant messaging. SIP servers are commercially available and the SIP standard is known in the art and need not be described in detail herein. See, for example, information at http://www.sipforum.org/.

III. An Exemplary Digital Audio Device

Figure 2:
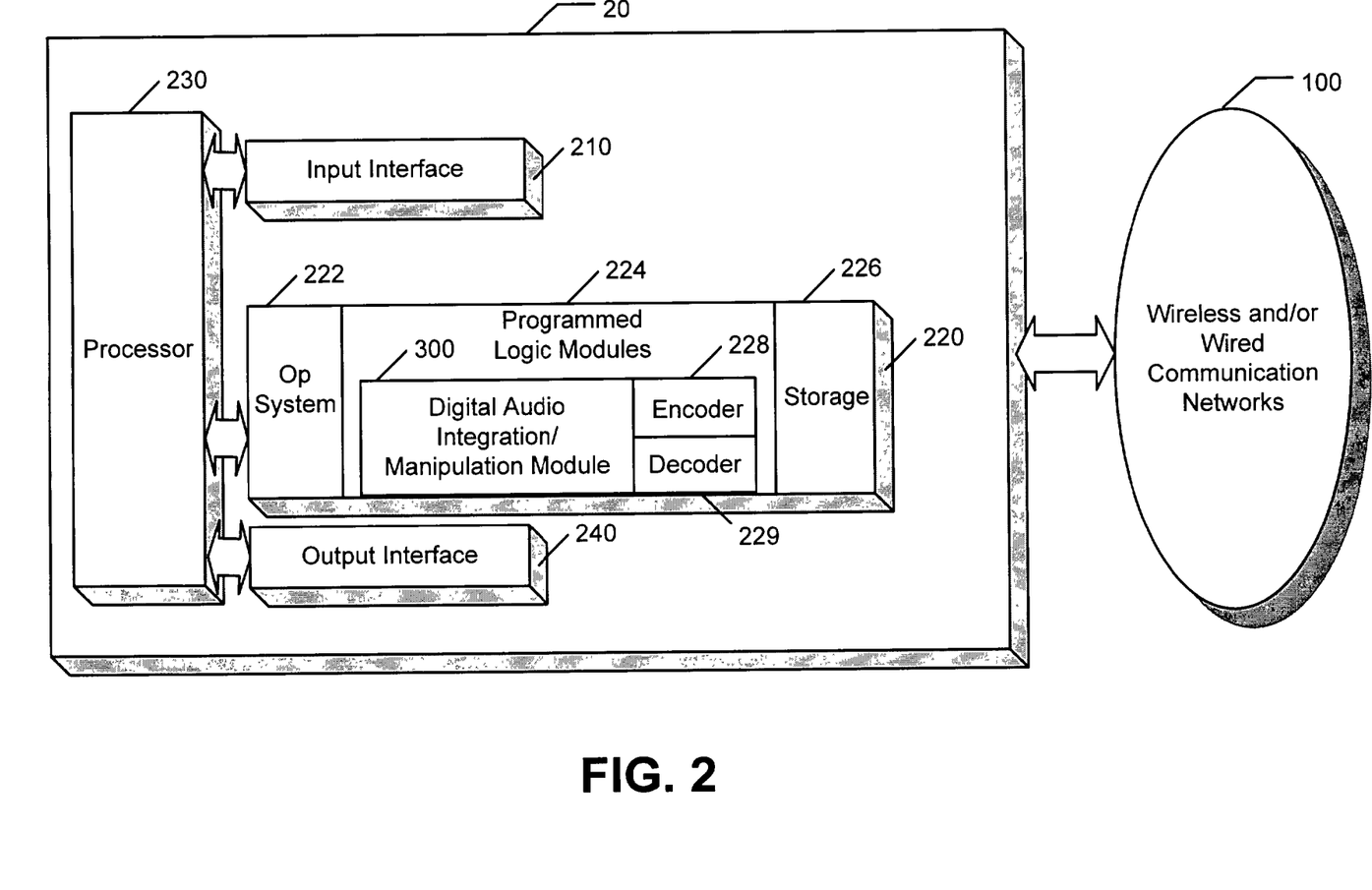
FIG. 2 illustrates a block diagram of an exemplary digital audio device.

FIG. 2 illustrates an exemplary digital audio device 20. The description of FIG. 2 is intended to provide a brief, general description of a common type of digital audio device in conjunction with which the various exemplary embodiments described herein may be implemented. Of course, other types of digital audio devices may be used as well. Further, various embodiments described herein may also be practiced in a distributed computing environment where tasks are performed by remote processing devices that are linked through a communications network, such as the wireless and/or wired communication networks 100. For example, in a distributed computing environment, program modules may be located in local and/or remote devices. Generally, the terms program, code, module, software, and other related terms as used herein may include routines, programs, objects, components, data structures, etc., that perform particular tasks or implement particular abstract data types.

As shown in FIG. 2, the exemplary digital audio device 20 includes an input interface 210, a computer-readable memory 220, a processor 230, and an output interface 240.

A user may input control and/or information into the device 20 via an input device connected through the input interface 210. For example, a user may input control via an input device to perform integration and manipulation on digital audio content. Input devices include, without limitation, a keyboard, a pointing device (e.g., pen, mouse, scroll pad, etc.), a set of buttons/knobs, a microphone, joystick, game pad, satellite dish, scanner, jog dial, an optical sensor and/or other devices known to those skilled in the art.

In an exemplary implementation, the input interface 210 is a serial port interface connected to the processor 230 that allows input device(s) to be physically coupled to the device 20. For example, an input device may comprise a separate add-on module that is connectable to the device 20 via the serial port interface. Alternatively, the input interface may be implemented as a parallel port, game port, a universal serial bus (USB), and/or implemented partially or entirely in software. For example, the input device may already be a part of the hardware structure of the device 20 and the input interface 210 is implemented at least partially in software. The input devices might allow inputs to be received via an XML enabled touch screen and/or an optical sensor that senses hand and/or body movements. The input interface 210, whether implemented in hardware or software or a combination thereof, is configurable to obtain digital audio content from one or more digital audio devices 20 via the communication networks 100.

The computer-readable memory 220 is configured to store digital audio content (e.g., digital audio streams, encoded sound recordings, etc.). The computer-readable memory 220 may include any combination of read-only memory (ROM), random access memory (RAM) of all types, a hard disk, a CD, and/or still other electronic, magnetic and/or optical media known to those skilled in the art.

In an exemplary embodiment, the computer-readable memory 220 includes an operating system 222, programmed logic modules 224, and storage 226. The operating system 222 may be implemented by operating systems known in the art, such as Linux. In an exemplary implementation, the programmed logic modules 224 include a digital audio integration/manipulation module 300, an encoder 228, and a decoder 229. An exemplary digital audio integration/manipulation module 300 will be described in more detail in Section IV below.

The encoder 228 encodes digital audio content obtained from an internal source (e.g., the storage 226) or an external source (e.g., an external memory and/or other digital audio devices, perhaps even over a network). Encoding techniques are known in the art and need not be described in detail herein. In one embodiment, the encoder 228 is optional and encoding may be performed elsewhere or not at all.

The decoder 229 decodes encoded digital audio content obtained from an internal source (e.g., the storage 226) or an external source (e.g., an external memory and/or other digital audio devices, perhaps even over a network). Decoding techniques are known in the art and need not be described in detail herein. For example, in one implementation, the decoder 229 is a MPEG audio decoder known as MAD. In one embodiment, the decoder 229 is optional and decoding may be performed elsewhere or not at all.

The processor 230 is configured to execute instructions in the programmed logic modules 224 based on digital audio content stored in the computer-readable memory 220 and/or obtained from an external source (e.g., external memory and/or another computing device, perhaps even over a network). The processor 230 is also configured to facilitate control among the components in the device 20 as appropriate.

The output interface 240 may be a sound adapter, or other types of interfaces that connect an output device, such as a monitor, speakers, and/or other types of output devices to the device 20.

It is to be understood that the above described and/or other components of a digital audio device 20 do not have to reside in a single device. These components may be distributed among multiple computing devices (e.g., a wristwatch, a PDA, a cell phone, a personal computer, etc.) operating in a distributed computing environment in accordance with a particular implementation.

Also, some or all of the programmed logic modules 224 may be implemented in hardware, perhaps even eliminating the need for a separate processor 230, if the hardware modules themselves contain the required processor functionality.

IV. An Exemplary Digital Audio Integration/Manipulation Module

Figure 3:
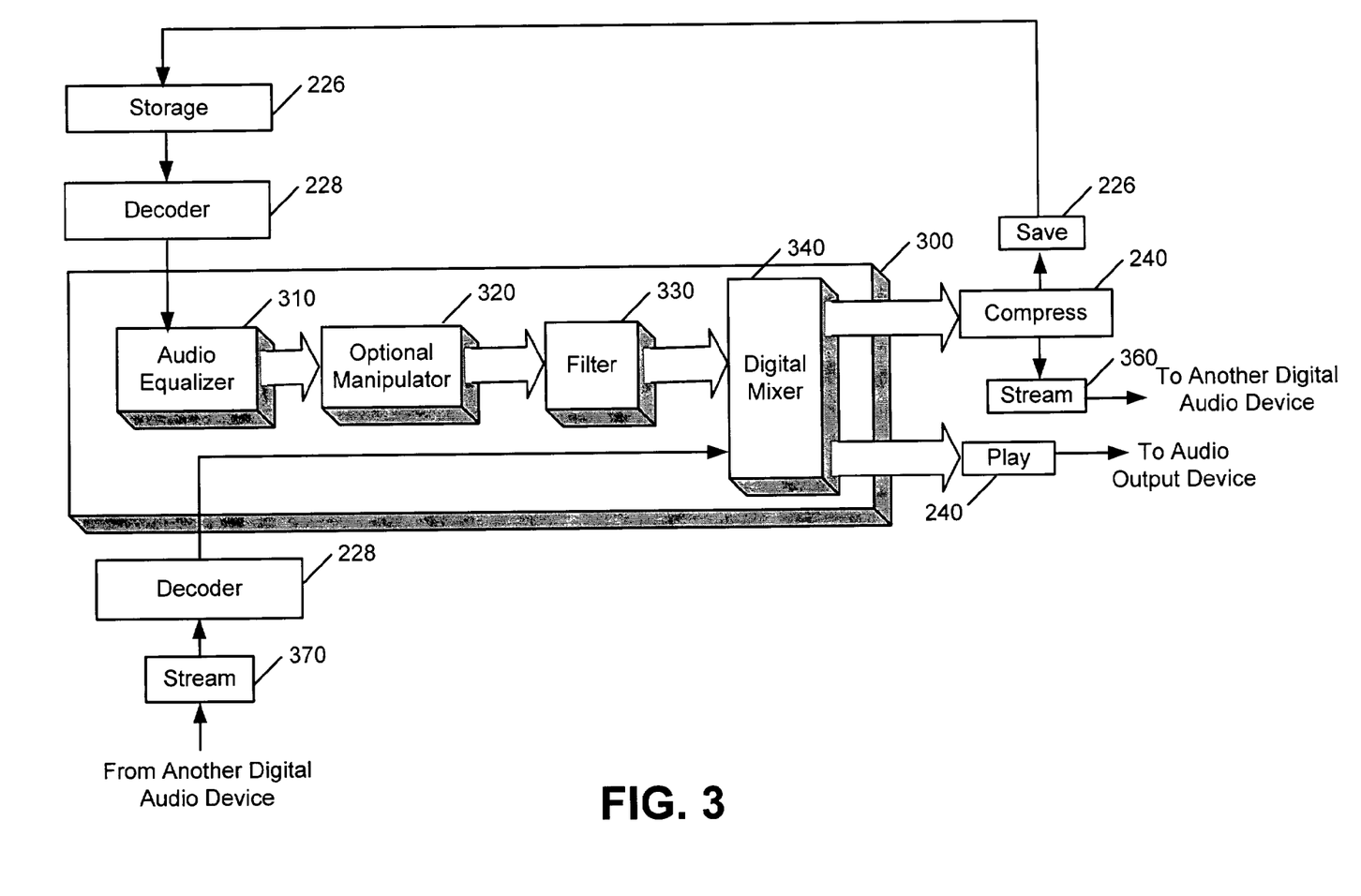
FIG. 3 illustrates a block diagram of an exemplary digital audio integration/manipulation module.

FIG. 3 illustrates an exemplary digital audio integration/manipulation module 300. The digital audio integration/manipulation module 300 includes an optional audio equalizer 310, an optional digital audio manipulator 320, an optional filter 330, and a digital mixer 340.

A. Exemplary Optional Modules

The optional audio equalizer 310 is an electronic device used to correct or to add emphasis to specified frequency ranges. Techniques for implementing an equalizer are known in the art and need not be described in detail herein.

Equalized digital audio content may further be manipulated by the optional digital audio manipulator 320. For example, scratching may be performed on one or more digital audio streams. Scratching refers to digitally changing pitch by exploiting sample rate conversion properties and may be performed in response to inputs from a jog dial via the input interface 210. For example, a user of the device 20 may use a jog dial to adjust the sample rate conversion, thereby effectively achieving the scratching sound effect. Other manipulating techniques (e.g., DJ functions) include, without limitation, looping, echo, filter, reverse play, and/or other techniques for achieving a particular sound effect. These manipulating techniques are known in the art, being commercially available in DJ digital turntables implemented in hardware and/or software, and need not be described in more detail herein.

The optional filter 330 performs any of a variety of known filtering functions on digital audio content. For example, the filter 330 might be used to attenuate a certain range of frequencies that is set by a cutoff frequency.

The optional modules described above are merely exemplary. Those skilled in the art will appreciate that still other implementations of these modules may be used. For example, the optional equalizer 310 and the optional digital audio manipulator 320 may be implemented as filters (e.g., similar to the optional filter 330).

B. An Exemplary Digital Mixer

The digital mixer 340 provides integration (e.g., mixing) of digital audio content. There are several types of mixing techniques, including, without limitation, beat mixing, key mixing, EQ mixing, fade mixing, FX mixing, remixing, and/or other mixing functions. Beat mixing, the most basic mixing technique, involves adjusting and synchronizing different beats in one or more digital audio streams such that the digital audio streams may be seamlessly played at the same time (e.g., when overlapping two songs, playing the end of a first song and the beginning of a second song at the same time). The various types of mixing techniques are known in the art and need not be described in detail herein.

In an exemplary implementation, whether in hardware, software, or a combination thereof, the digital mixer 340 includes at least two channels and a crossfader. Typically, a channel controls digital audio content from a source. For example, each channel may have a volume slider (or a knob, etc.) which controls the output volume of digital audio content from a corresponding source. The crossfader allows a user to integrate output of multiple channels. For example, a crossfader may be implemented as a slider (or a knob, etc.) that provides control of incremental decreasing of the volume of digital audio content of a first source while proportionally increasing the volume of digital audio content of a second source. Digital mixers are commercially available (in hardware, software, or a combination thereof) and known in the art; thus, need not be described in more detail herein.

As shown in FIG. 3, the digital mixer 340 may be configured to integrate (e.g., mix) a first digital audio stream obtained from an internal 226 or external storage (or perhaps even over a network) with one or more other digital audio steam(s) obtained from another device 370. In one implementation, the first digital audio stream (i.e., from storage or a network) is decoded by a decoder 228 then output to the audio equalizer 310.

A second digital audio stream may be obtained from a second digital audio device (not shown) that is operationally independent of the first digital audio device. In one implementation, the second digital audio device may stream the second digital audio stream to the first digital audio device in substantially real time via the wireless and/or wired communication networks 100. In one instance, the second digital audio stream is decoded by a decoder 228 then output directly to the digital mixer 340 of the first digital audio device.

Alternatively, any or all of modules 310-340 could process encoded digital audio content (i.e., from storage 226 or another digital audio device 370) with a subsequent decoding performed after integration by the digital mixer 340.

In an exemplary embodiment, the integrated digital audio stream may be compressed, encoded (e.g., via the encoder 240), and/or played via the output interface 240. In one instance, the integrated digital audio stream is compressed and/or encoded then stored internally 226 or externally (or perhaps even over a network). In another instance, the integrated digital audio stream may be compressed and/or encoded and then streamed 360 in substantially real time to another device (e.g., the second digital audio device) via the wireless and/or wired communication networks 100. In yet another instance, the integrated digital audio stream may be played via an output device, such as speakers. Of course, one or more of the above may be performed singly or in combination in accordance with a particular implementation. For example, the integrated digital audio stream may be compressed, stored, streamed, and played.

It is to be understood that one or more sub-modules of the digital audio integration/manipulation module 300 described above may be implemented (e.g., as programmed logic) in a single device or in multiple devices operating in a distributed computing environment. Further, one or more sub-modules described above of the digital audio integration/manipulation module 300 may be implemented as an add-on module to the digital audio device 20. For example, an add-on module may comprise an interface for obtaining digital audio content (e.g., digital audio streams) from one or more digital audio devices and a mixer configured to (1) integrate digital audio content and (2) provide integrated digital audio content to one or more digital audio devices.

The digital audio device 20 having the exemplary digital audio integration/manipulation module 300 as described above (i.e., either as a part of the device 20, as an add-on module, or in multiple distributed computing devices) may be used to establish a collaborative audio session.

V. An Exemplary Process for Establishing a Collaborative Audio Session

Figure 4:
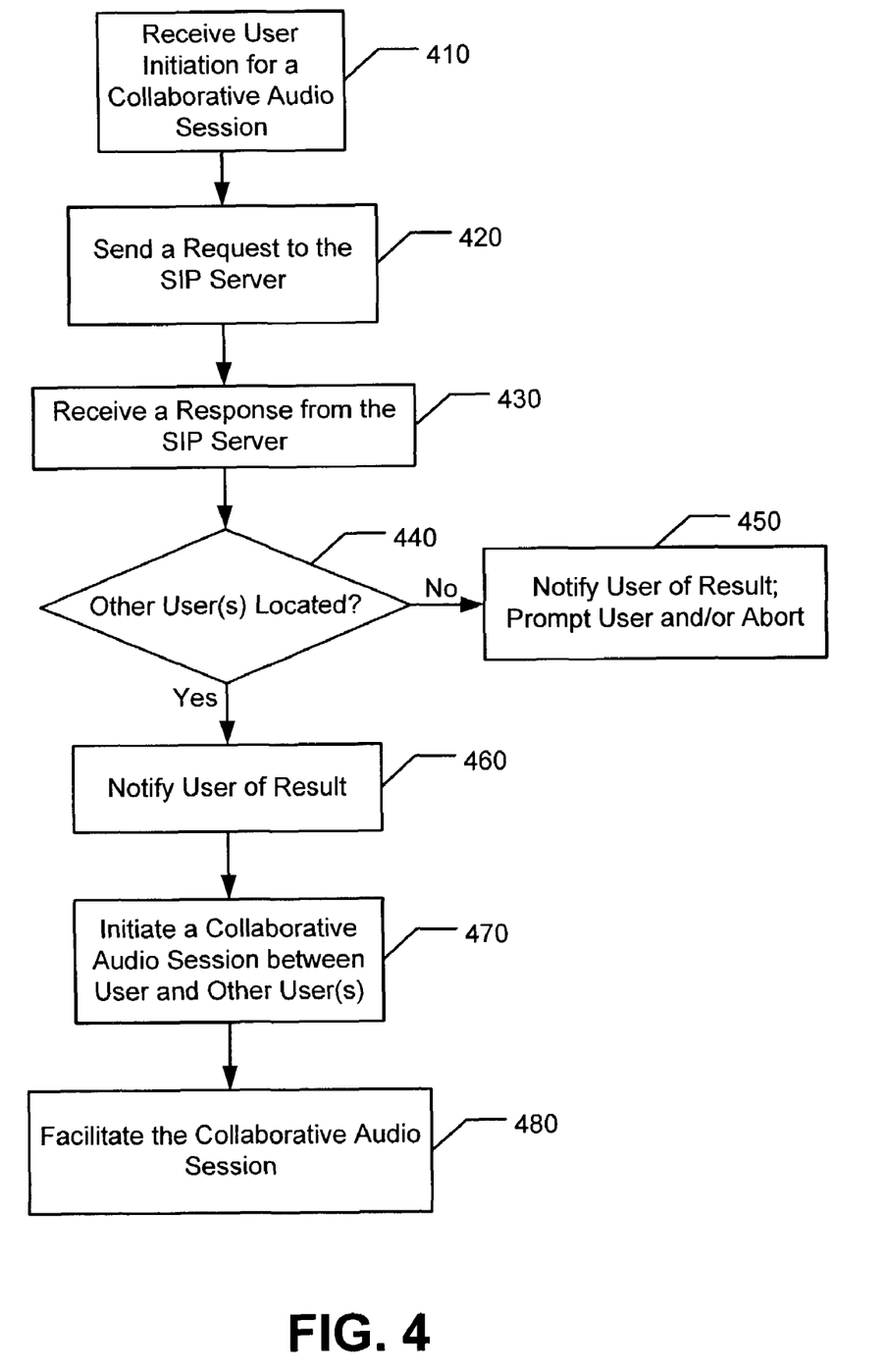
FIG. 4 illustrates an exemplary process for establishing a collaborative audio session.

FIG. 4 illustrates an exemplary process for establishing a collaborative audio session between multiple users. At step 410, a first user (e.g., a first collaborator) of a first digital audio player may initiate a collaborative audio session. In one implementation, the first user may have the option of selecting a second user (e.g., a second collaborator) among one or more identifiers (e.g., names, ID numbers, etc.) displayed on a display screen (e.g., of the first digital audio player) to request the second user's participation. For example, identifier(s) of one or more other users who are currently connected to a network (e.g., communication network 100) may be displayed to the first user. In another implementation, the first user may have an option to request a specific second user for participation by inputting an identifier of the second user. For example, the first user may input an identifier in a pop-up box, speak an identifier into a microphone, or otherwise communicate the identifier to the first digital audio player. In response, the first digital audio player sends a request to the server 30 (step 420).

The server 30 (e.g., a SIP server) processes the request in accordance with configured protocols (e.g., SIP protocols) and sends a response back to the first digital audio player. For example, during processing, the server 30 may transmit a solicitation to a second digital audio player (e.g., the digital audio player associated with the second user requested by the first digital audio player) and receive a response from the second digital audio player which indicates whether or not the second user wishes to participate in a collaborative audio session. The server 30 then generates and sends a response to the first digital audio player indicating a result of the processing (e.g., a response from the second digital audio player).

At steps 430 and 440, the first digital audio player receives the response from the server 30 and determines if a particular (or any) user has been located for participation in a collaborative audio session. If not, the first user is notified of the result (step 450). In one implementation, the first user may be prompted to input an identifier of yet another user (if a specific second user was inputted), to select yet another user (from a list of users), and/or to abort. Alternatively or in combination, the first user may have the option of being notified when the second user becomes available (e.g., becomes connected to the network and/or desires to join a collaborative audio session).

Referring back to step 440, if a second user(s) is located, the first user is notified of the result (step 460). Next, the first user initiates a collaborative audio session with the located second user via the communication networks 100 (step 470). In one implementation, the server 30 may facilitate the initiated collaborative audio session by providing a connection between the players or performing other functions (e.g., DJ functions, etc.).

The processes described above are merely exemplary, and their corresponding examples are merely illustrative. Those skilled in the art will appreciate that still other techniques for establishing a collaborative audio session may be used according to the requirements of a particular implementation.

For example, in one implementation, the server 30 may not be needed for establishing a collaborative audio session. In this example, the digital audio devices may operate in an ad-hoc network. An ad-hoc (or "spontaneous") network is a local area network or other small network, especially one with wireless or temporary plug-in connections, in which some devices are part of the network only for the duration of a communications session or, in the case of mobile or portable devices, while in some close proximity to the rest of the network. The digital audio devices may be configured in accordance with SIP standard to be operable in an ad-hoc mode (e.g., as part of an ad-hoc network). In one instance, when the digital audio devices are operating in an ad-hoc mode, a digital audio device may attempt to locate another digital audio device by broadcasting a SIP message. If another digital audio device is in range (e.g., close enough to receive the broadcast), it may respond to the digital audio device to join in a collaborative audio session. Implementations of ad-hoc networks are known in the art. See, for example, http://whatis.techtarget.com/definition/0,289893, sid9_gci213462,00.html.

After establishing a collaborative audio session, the users (or collaborators) may conduct the collaborative audio session.

VI. An Exemplary Collaborative Audio Session

Figure 5:
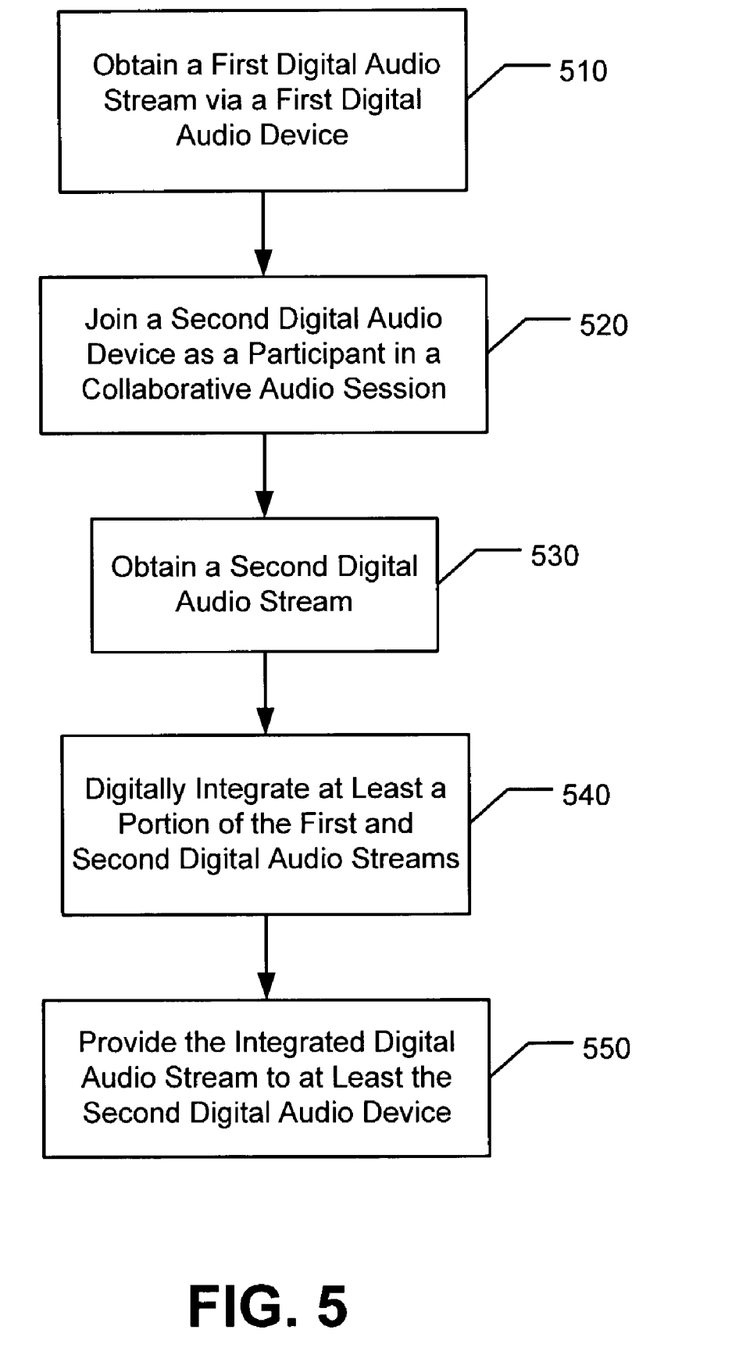
FIG. 5 illustrates an exemplary collaborative audio session.

FIG. 5 illustrates an exemplary collaborative audio session (e.g., a joint audio production, a jamming session, etc.) between first and second digital audio devices. At 510, a first digital audio device, operated by a first user, obtains a first digital audio stream. For example, the first digital audio stream is obtained from an internal (e.g., computer-readable memory 220) and/or external storage. Next, a second user having a second digital audio device is joined as a participant in a collaborative audio session with the first digital audio device (520). An exemplary process of joining a second user having a second digital audio device was described in Section V above. In one implementation, the second digital audio device is under independent operational control of the first digital audio device. Further, the second digital audio device may or may not have similar capabilities as the first digital audio device. For example, the second digital audio device may be capable of scratching one or more digital audio streams but is incapable of other manipulation functions (e.g., other DJ functions). At 530, the first digital audio device obtains a second digital audio stream from the second digital audio device. Next, the first digital audio device digitally integrates at least a portion of the first digital audio stream and the second digital audio stream (540). For example, the first digital audio device may mix the first and second digital audio streams with a digital mixer 340 (see FIG. 3). In one implementation, prior to mixing the first and second digital audio streams, the first digital audio device may manipulate one or more of the digital audio streams to achieve a desired sound effect. For example, scratching and/or other DJ functions may be performed on the first and/or second digital audio streams.

At 550, the first digital audio device provides the integrated digital audio stream to at least the second digital audio device. For example, the integrated digital audio stream may be provided to the second digital audio device directly from the first digital audio device via the communication networks 100. In another example, the integrated digital audio stream may be provided to the second digital audio device indirectly, such as via a server (e.g., a SIP server) connected to the communication networks 100. Alternatively and in combination, the first digital audio device may also store and/or play the integrated digital audio stream on the first digital audio device.

In another implementation, during the collaborative audio session, the first digital audio device may also stream the first digital audio stream to the second digital audio device. In this implementation, the second user may digitally integrate at least a portion of the first digital audio stream and the second digital audio stream in the second digital audio device. Further, the second digital audio device may provide the integrated digital audio stream to the first digital audio device, store and/or play the integrated digital audio stream on the second digital audio device.

In one implementation, the collaborative audio session is performed in substantially real time. For example, the first digital audio device obtains the second digital audio stream from the second digital audio device via the communication networks 100, integrates the first and second digital audio streams, then streams the integrated digital audio stream to the second digital audio device in real time via the communication networks 100.

The processes described above are merely exemplary, and their corresponding examples are merely illustrative. Those skilled in the art will appreciate that still other types of collaborative audio sessions may be implemented according to the requirements of a particular implementation.

VII. Operating Environment

The embodiments described herein may be implemented in an operating environment comprising software installed on a computer, in hardware, or in a combination of software and hardware.

The software and/or hardware would typically include some type of computer-readable media which can store data and logic instructions (such as those which, when executed, enables a collaborative audio session among multiple users) that are accessible by the computer or the processing logic within the hardware. Such media might include, without limitation, hard disks, floppy disks, magnetic cassettes, flash memory cards, digital video disks, Bernoulli cartridges, random access memories (RAMs), read only memories (ROMs), and the like.

VIII. Conclusion

The foregoing examples illustrate certain exemplary embodiments from which other embodiments, variations, and modifications will be apparent to those skilled in the art. The inventions should therefore not be limited to the particular embodiments discussed above, but rather are defined by the claims.

What is claimed is:

1. A method for operating a digital audio device in a DJ mode, thereby facilitating a collaborative audio session with another digital audio device, comprising:
    (a) at a first digital audio device operated by a first user, obtaining a first digital audio stream;
    (b) joining a second user having a second digital audio device as a participant in a collaborative audio session with said first digital audio device;
        (i) said second digital audio device being under independent operational control of said first digital audio device;
    (c) obtaining a second digital audio stream from said second digital audio device;
    (d) digitally integrating, at said first digital audio device, at least a portion of said first digital audio stream and said second digital audio stream; and
    (e) providing said integrated digital audio stream to at least said second digital audio device,
        wherein prior to performing the digital integration in (d), equalizing at least one of said first and second digital audio streams to produce an equalized digital audio stream,
        digitally manipulating the equalized digital audio stream to achieve a desired sound effect, and
        filtering the manipulated digital audio stream to attenuate a predetermined frequency range set by a cutoff frequency.

2. The method of claim 1 where said (e) is performed in substantially real time.

3. The method of claim 1 where said integrating includes mixing.

4. The method of claim 1 where said sound effect includes scratching at least a portion of said manipulated digital audio stream.

5. The method of claim 1 where said sound effect includes looping at least a portion of said manipulated digital audio stream.

6. The method of claim 1 where said sound effect includes echoing at least a portion of said manipulated digital audio stream.

7. The method of claim 1 where said sound effect includes filtering at least a portion of said manipulated digital audio stream.

8. The method of claim 1 where said sound effect includes reverse playing at least a portion of said manipulated digital audio stream.

9. The method of claim 1 where said (b) includes:
    (i) transmitting a solicitation to said second digital audio device; and
    (ii) receiving an affirmative response to said solicitation.

10. The method of claim 1 where said (b) occurs in response to a request from said second digital audio device.

11. The method of claim 1 where:
    said first digital audio device and second digital audio device are networked; and
    a request for the second user to join in the collaborative audio session adheres to a protocol known as SIP.

12. The method of claim 1 further comprising allowing the first user of the first device performing said method to control at least one of said (a)-(e) via a user interface.

13. The method of claim 1 where said (e) includes transmitting said integrated digital audio stream to a digital audio device having a similar capability as said first digital audio device to perform said recited method on a plurality of digital audio streams.

14. The method of claim 1 where said (e) includes transmitting said integrated digital audio stream to a digital audio device of a different configuration than the first digital audio device.

15. The method of claim 1 where said (d) is collectively performed by a plurality of computing devices within a distributed computing environment.

16. The method of claim 1, wherein the first and second digital audio streams are pre-recorded.

17. A digital audio device operable in a DJ mode to establish a collaborative audio session with another digital audio device, comprising:
    (a) a memory to store a first digital audio stream;
    (b) an interface connectable to a second digital audio device operated by a collaborator wishing to interact with a user of said second digital audio device in a joint audio production;
    (c) a memory to receive a second digital audio stream from said second digital audio device;
    (d) programmed logic to digitally integrate at least a portion of said first digital audio stream and said second digital audio stream; and
    (e) an output module to provide said integrated digital audio stream to at least said second digital audio device,
        wherein, prior to integrating at least a portion of the first digital audio stream and the second digital audio stream, said programmed logic is to equalize at least one of said first and second digital audio streams to produce an equalized digital audio stream, digitally manipulate the equalized digital audio stream to achieve a desired sound effect, and filter the manipulated digital audio stream to attenuate a predetermined frequency range set by a cutoff frequency.

18. The device of claim 17 where said (e) is performed in substantially real time.

19. The device of claim 17 where said (d) includes a mixer.

20. The device of claim 17 where said programmed logic is operable in response to a request for collaboration from said second digital audio device.

21. The device of claim 17 further comprising a user interface allowing user control of said first digital audio device.

22. The device of claim 17 where said programmed logic of said (d) is deployed among a plurality of computing modules.

23. A computer-readable medium including logic instructions for operating a digital player in a DJ mode, thereby facilitating a collaborative audio session with another digital player, said logic instructions that, if executed:
    (a) obtain a first encoded sound recording from a first digital player operated by a first user;
    (b) join a second user having a second digital player as a participant in a collaborative audio session with said first digital player;
        (i) said second digital player being under independent operational control of said first digital player;
    (c) obtain a second sound recording from said second digital player;

(d) in said first digital player, integrate at least a portion of said first and second sound recordings; and (e) providing said integrated sound recording to said second digital player, wherein said logic instructions include instructions which equalize at least one of the first and second sound recordings to produce an equalized sound recording, digitally manipulate the equalized sound recording to achieve a desired sound effect, and filter the manipulated sound recording, prior to said integration.

24. The computer-readable medium of claim 23 where said (e) is performed in substantially real time.

25. The computer-readable medium of claim 23 where said (d) includes mixing.

26. The computer-readable medium of claim 23 further comprising logic instructions that, if executed, process a request for participation from said second digital player, prior to at least said (b).

27. The computer-readable medium of claim 23 further comprising logic instructions that, if executed, provide a control mechanism for at least one of said (a)-(e).

28. A digital audio device capable of operation in a DJ mode, thereby facilitating a collaborative audio session with another digital audio device, comprising:
   (a) means, at a first digital audio device operated by a first user, for obtaining a first digital audio stream;
   (b) means for joining a second user having a second digital audio device as a participant in a collaborative audio session with said first digital audio device;
      (i) said second digital audio device being under independent operational control of said first digital audio device;
   (c) means for obtaining a second digital audio stream from said second digital audio device;
   (d) means, at said first digital audio device, for digitally integrating at least a portion of said first digital audio stream and said second digital audio stream;
   (e) means for providing said integrated digital audio stream to at least said second digital audio device; and
   (f) means for equalizing at least one of said first and second digital audio streams to produce an equalized digital audio stream, digitally manipulating the equalized digital audio stream to achieve a desired sound effect, and filtering the manipulated digital audio stream to attenuate a predetermined frequency range set by a cutoff frequency, prior to the integrating in (d).

29. The device of claim 28 where said providing is performed in substantially real time.

30. The device of claim 28 where said integrating includes mixing.

31. The device of claim 28 where said joining in said (b) occurs in response to a request from said second digital audio device.

32. A digital audio system to facilitate a collaborative audio session, comprising:
   (a) a first digital audio device operable by a first user to:
      (i) provide a first digital audio stream;
      (ii) join a second user having a second digital audio device as a participant in a collaborative audio session with said first digital audio device;
         (A) said second digital audio device being under independent operational control of said first digital audio device;
      (iii) obtain a second digital audio stream from said second digital audio device;
      (iv) digitally integrate at least a portion of said first digital audio stream and said second digital audio stream;
      (v) provide said integrated digital audio stream to said second digital audio device; and
      prior to said digital integration, equalize at least one of said first and second digital audio streams to produce an equalized digital audio stream, digitally manipulate the equalized digital audio stream to achieve a desired sound effect, and filter the manipulated digital audio stream to attenuate a predetermined frequency range set by a cutoff frequency; and
   (b) a server to:
      (i) communicate with said first digital audio device and said second digital audio device over a network;
      (ii) receive a request from at least one of said digital audio devices for said joining in said (a)(ii); and
      (iii) facilitate communication between said first digital audio device and said second digital audio device.

33. The system of claim 32 where said server is to assist in performing at least a portion of said (a).

34. In connection with a first digital audio device including a computer-readable memory for storing an encoded first digital audio stream, a processor for decoding said first digital audio stream, and an output interface for playing said decoded first digital audio stream; an improvement comprising an add-on module for converting said first digital audio device into a personal DJ station operable by a first user, including:
   (a) an interface to said first digital audio device;
   (b) an interface to a second digital audio device operable by a second user:
      (i) under operational control independent of said first digital audio device; and
      (ii) to receive a second digital audio stream from said second digital audio device;
   (c) an equalizer to equalize at least one of the first and second digital audio streams to produce an equalized digital audio stream;
   (d) a manipulator to manipulate the equalized digital audio stream to achieve a desired sound effect;
   (e) a filter to filter the manipulated digital audio stream to attenuate a predetermined frequency range set by a cutoff frequency; and
   (f) a mixer to:
      (i) receive said filtered digital audio stream and said second digital audio stream;
      (ii) integrate at least a portion of said filtered digital audio stream and said second digital audio stream; and
      (iii) provide said integrated digital audio stream to at least one of said digital audio devices.

35. The system of claim 34 to perform said (c)(iii) in substantially real time.

36. The system of claim 34 where said add-on module is to process a request for participation of said second digital audio device, prior to at least said (b)(ii).

37. The system of claim 34 where said add-on module further comprises a user interface for control thereof.

38. A method for operating a digital audio device in a DJ mode and facilitating a collaborative audio session, comprising:
   (a) obtaining at least one digital audio stream from an external source at a first digital audio device operable by a first user;

(b) equalizing said at least one digital audio stream, manipulating the equalized digital audio stream to achieve a desired sound effect while the stream is being obtained, filtering the manipulated digital audio stream to attenuate a predetermined frequency range set by a cutoff frequency, and integrating the filtered digital audio stream with another digital audio stream; and (c) providing said integrated digital audio stream to at least a second digital audio device operable by a second user.

39. A digital audio device in a communications network providing digital audio content including a digital audio stream, the device comprising:
- a digital audio player to play the digital audio content including the digital audio stream;
- an input interface to receive the digital audio content via the communications network;
- an equalizer to equalize the digital audio stream;
- a manipulator module to manipulate the equalized digital audio stream to produce a manipulated digital audio stream having a desired sound effect;
- a filter to filter the manipulated digital audio stream to attenuate a predetermined frequency range set by a cut-off frequency;
- a digital mixing module to produce an integrated digital audio stream (IDAS), wherein the IDAS is an integration of a portion of the filtered digital audio stream and a portion of a second digital audio stream;
- a storage to store the digital audio content; and
- a processor to play the digital audio player.

40. The digital audio device of claim 39, wherein the desired sound effect includes scratching.

41. The digital audio device of claim 39, wherein the desired sound effect includes looping.

42. The digital audio device of claim 39, wherein the IDAS includes mixing.

43. The digital audio device of claim 39, wherein the digital audio device is one of a cellular phone and a personal computer.

44. The digital audio device of claim 39, wherein the digital audio player includes functions for play, forward and reverse.

45. The digital audio device of claim 39, wherein the digital audio content is digitized into a format which is one of a Moving Pictures Experts Group (MPEG) format and a Waveform Audio File (WAV) format.

46. The digital audio device of claim 39, wherein the input interface includes one or more of a touch screen and an optical sensor.

* * * * *